United States Patent [19]

Kapolyi

[11] 4,436,550

[45] Mar. 13, 1984

[54] PROCESS FOR RECOVERY OF ALUMINUM FROM CARBONACEOUS WASTE PRODUCTS

[75] Inventor: Laszlo Kapolyi, Budapest, Hungary

[73] Assignee: Tatabanyai Szenbányák, Tatabánya, Hungary

[21] Appl. No.: 340,996

[22] Filed: Jan. 20, 1982

Related U.S. Application Data

[63] Continuation of Ser. No. 15,970, Feb. 28, 1979, abandoned, which is a continuation-in-part of Ser. No. 819,811, Jul. 28, 1977, abandoned, which is a continuation-in-part of Ser. No. 755,405, Dec. 29, 1976, abandoned.

[51] Int. Cl.³ .......................................... C22B 21/02
[52] U.S. Cl. ..................................... 75/10 R; 75/24; 75/68 R; 106/117; 204/67
[58] Field of Search .................... 75/24, 25, 101 R, 11; 423/119; 65/20; 106/117

[56] References Cited

U.S. PATENT DOCUMENTS 1,815,888  7/1931  Baily ....................................... 75/24
3,853,535  12/1974  Szabo et al. ...................... 75/101 R Primary Examiner—M. J. Andrews
Attorney, Agent, or Firm—Gabriel P. Katona

[57] ABSTRACT

A carbonaceous waste product, preferably containing 30 to 60% mineral substances, 35 to 55% carbonaceous materials, 5 to 20% water, and having a calorific value of 2,000 to 3,500 k cal/kg is fired to produce thermal energy and a combustion residue. The residue is adjusted, if necessary, by addition of mineral containing additives so that it contains 15 to 50% alumina, 15 to 20% silica and 13 to 45% other oxides (mainly iron oxide, manganese oxide and calcium oxide). Sufficient limestone is added to produce a mixture containing 1.8 to 2.2 moles of calcium oxide per mole of silica and 1.1 to 1.3 moles of calcium oxide per mole of alumina. The mixture is then sintered. The total energy requirements of the sintering step are supplied by the energy generated in the firing step. Useful products such as cement and cast stone can be produced from the sintered product.

4 Claims, No Drawings

PROCESS FOR RECOVERY OF ALUMINUM FROM CARBONACEOUS WASTE PRODUCTS

This is a continuation of Ser. No. 15,970, filed on Feb. 28, 1979, which is a continuation-in-part of Ser. No. 819,811, filed July 28, 1977, which is a continuation-in-part of Ser. No. 755,405, filed Dec. 29, 1976 all abandoned.

The invention relates to a process for the simultaneous production of thermal energy and/or electric power, and metals and or metal oxides and/or metal alloys, and silicates (e.g. hydraulic binding materials and/or synthetic rocks and/or melted silicates), in a complex energitics-technological system, from a carbonaceous material whose energy content and metallic and non-metallic components are adjusted if need be by addition of suitable additives.

Use of mineral substances and energy sources found in the earth's crust increases proportionally with increase in technical development. This activity is characterized by the continuous increase of the distance between industrial centers and the sites of exploitation of basic raw materials, and by downward movement of operations to deeper layers at the sites of exploitation. Additionally, as the site of the raw materials is developed the proportion of the components of the deposit is altered. Accordingly the relative proportions between the components in the basic material also change.

The above statements are of general validity, and hold true for, for example, mineral substances of heterogeneous composition such as coal, lignite, oil shale etc. A peculiar feature of industrial development of these materials is that as industry develops and as new fields of use are discovered they replace each other in many applications. Thus e.g. the large world market of coal is the result of a polarization between the producing and the utilizing sites, which results in appreciable shipping cost and thereby increases the price. Consequently, the competitiveness of coal as compared with other energy sources, e.g. oil, is decreased because the cost of shipping these other sources of energy is less, their energy content is higher, and more modern methods of transportation are available for such sources.

The present state of the art is characterized by the fact that the utilization of the energy-carrying mineral substances of heterogeneous composition is limited generally to only one of their components e.g. to the carbon content, in the case of coal. This also holds true for other mineral substances. Consequently, due to the large amount of material which is accumulated in so-called spoil-banks, the exploitation and processing of a considerable portion of mineral and ore resources is not economical. For example, despite various efforts, no economically feasible process is presently known for using coals of low calorific value, poor quality ores, certain oil shales, bauxites of low modulus, etc.

The aim of the present invention is to develop an economical process for exploitation and use of carbonaceous materials containing a high proportion of mineral substances (e.g. coal and oil shales). Another aim of the present invention is to provide an economical process for the utilization of other otherwise unprocessable mineral substances or industrial by-products. Such complex utilization problems can only be solved by finding novel fields of use, by departing from conventional technological processes and by eliminating long routes of transportation for material components to be processed.

The present invention is based on the recognition that the spoil of mineral containing carbonaceous materials (e.g. of coal) comprises in fact a mass of utilizable components containing sources of thermal energy and useful metals which can be qualitatively and quantitatively favorably influenced by the optional addition of other mineral containing additives, and which components can be utilized as valuable materials provided the conventional system of energy transformation and the technological steps are suitably modified.

According to the present invention the calory content of mineral contaning carbonaceous raw materials (particularly coals and oil shales) is utilized in a complex energetics-technological system, for generating power while the non-carbonaceous portion of the raw materials is utilized for technological purposes.

In the process of the present invention a carbonaceous raw material having a high content of mineral substances or a controlled mixture of carbonaceous raw material and mineral additives produced by feeding the carbonaceous raw material and the mineral additives into the system in constant amounts per unit time, are fired in a system for generating heat energy. The materials are fired directly or after prior utilization of their content of combustible gases by distillation (viz. gasification). The solid or liquid residue containing the mineral constituents is adjusted, if need be, with further mineral additives. Then the industrially useful components are extracted. Such components may be utilized in the production of metals and metal alloys such as aluminum, FeSi, FeSiAl, FeMn etc., alloys, synthetic rock and cement. As a result, the amount of waste generated by the complex system of the present invention is reduced to the lowest possible level. The recovered energy content of the system is preserved in a closed technological system directly coupled to the energetics system, in a manner such that preferably, the total power requirement of the technological system is supplied by the heat energy and/or electric energy generated in the energetics system.

The starting unit of the complex system of the present invention is a plant which utilizes the combustible carbonaceous components of a waste material starting product to generate energy and simultaneously adjusts the mineral content of the starting material or the residue produced on firing same so that it can be used as a starting material in other operations.

The whole system consists of complementary units coupled to one another horizontally and vertically, each unit being capable of independent operation. The units are programmed in a way that the entire complex system is run under optimum conditions. This enables economical operation of the system even though operation of certain units alone may not be economical.

The mineral containing carbonaceous material used as the starting material of the process of the present invention is selected from the group consisting of materials having low combustible (carbon) content (eg. coals contaminated with overburden, oil shale etc.), materials whose combustible (carbon) content has been reduced by subjecting such materials to gasification and a mixture of coal having reduced combustibility with a mineral component; all of the foregoing having a heat of combustion of about 2,000 to 3,500 k Cal/Kg.

Suitable mineral containing carbonaceous starting materials are coals, brown coals, lignites, peats, oil shales which have a heat of combustion (calorific value) of 2000–3500 K cal/Kg. Preferably, the starting materials contain 30–60% mineral substances, 35–55% combustible material and 5–20% moisture. The residue obtained after firing such carbonaceous starting materials must contain 15–50% $Al_2O_3$, 15–20% $SiO_2$ and 13–45% of other oxides (mainly $Fe_2O_3$, MnO and CaO). These materials have multiple components. Consequently, all of their components must be taken into account when considering their potential use.

The basic concept of the present invention, which relates to a complex energetics-technological system is the recognition that on the one hand, the combustion wastes of power generating stations can be considered as a secondary source of raw material, and on the other hand, the mineral content of substances present in the energy source (and, respectively, its physico-chemical state) are prepared for further technological processing by firing. Slag and fly-ash obtained in various firing processes are, by virtue of their composition and their mineral content, potential energy sources which can be utilized together in subsequent technological steps. The mineral composition of the slag and fly-ash obtained in power generating stations consists predominantly of mullite. In the consecutive processing stage, the mullite reacts more readily with the CaO content of limestone added as an additive, than with native $Al_2O_3$ and $SiO_2$. The mineral additives can also be added to the preformed slag or when a slag-melting boiler is employed to the energy carrier itself. Thus, for example, the use of a slag-melting boiler, with cyclone-type firing, to produce a secondary raw material of the complex system, enables one to feed into the fire-room the actual energy carrier as well as the additives. By means of these mineral additives, an optimum composition of the initial material stream of complex carbon utilization technology can be attained i.e. the most expedient ratio of components (from the point of view of obtaining the desired products) can be maintained.

The process of the present invention advantageously utilizes for example, coal containing materials, in a complex energy technological manner. By combustion of coal and gases distilled out of coal, heat and electrical energy are respectively produced, in situ, and utilized for simultaneous conversion of coal slags modified with predetermined additives. Moreover, this is accomplished without removing any byproducts from the system.

The metal oxide and metal oxysilicate component ratios of the slag are adjusted so as to produce a desired product (viz. a product suitable as a starting material in the production of aluminum, cement or artificial stone). This is accomplished by introduction of modifying additives during the process, as well as by means of the intermediate or final recovery of the iron and aluminum content of the slag through alloys.

According to one preferred embodiment of the present process, the metal oxide and metal oxysilicate ratios of the slag are adjusted so that at least 20% $2CaO.SiO_2$ and 20% $12 CaO.7Al_2O_3$ phase components are present, the molar ratio of CaO to $SiO_2$ is 2.2 to 6.0:1 and the molar ratio of CaO to $Al_2O_3$ is 4.5 to 8.5:1. Less than 1% Fe-Si or Fe-Si-Al alloy is then added to promote self disintegration and the mixture is sintered through use of the energy generated in situ in the above described combustion step of the process. The resultant product is useful as a starting material for the manufacture of cement.

In another preferred embodiment of the present process, the slag is adjusted so that at least 20% $2CaO.SiO_2$ and 20% $12 CaO.7Al_2O_3$ phase components are present; the molar ratio of CaO to $SiO_2$ is 2.2 to 6.0:1, the molar ratio of CaO to $Al_2O_3$ is 1.1 to 1.3:1 and the molar ratio of $(CaO+MgO+Na_2O+K_2O)$ to $Al_2O_3$ is 1.3 to 2.9:1. The adjusted slag is then melted through use of the heat energy produced in situ during the above described combustion step of the process. The resultant material is useful as a starting material in the manufacture of artificial stone.

In the present process, removal of FeSi is required when the mineral and combustible components have too high a content of iron and silicon. Since iron and silicon are principally present in the mineral component as oxides, it is necessary to reduce same and remove the iron and silicon as an Fe-Si alloy. It is known that when a catalytic amount of Fe-Si is added to an ash-bauxite-limestone mixture and the mixture is sintered, the resulting product disintegrates by itself. In other words, the presence of a catalytic amount of Fe-Si promotes conversion into material having small particle size, without grinding. For such reason, in the process of the present invention, the high iron oxide-silica content is first reduced by removal of Fe-Si alloy, then a small catalyst amount of the Fe-Si alloy is added to promote disintegration of the sintered mixture.

As stated heretofore, the process of the present invention produces metal oxides and metal oxysilicates which may be employed as starting materials in the manufacture of aluminum, cement and artifical stone.

Ores containing Al, Si, Fe, Mn, Ca, etc., wastes, byproducts such as poor quality bauxites, carbonate-containing manganese ores, siderite, red mud of alumina plants etc., may serve as mineral additives. The mineral additives and energy sources of good quality are generally fed into the boilers in proportions required by the parameters of the operation of the cyclone firing. In practice it is expedient to adjust the calorific value of the mixture to a level higher than 2000 kcal per kg of mixture. If this is not done, self-supporting firing will not be maintained and the mixture can be utilized only as a complimentary firing. When the mixture is adequately fired the slag is obtained from the cyclone in a melted state, with a viscosity of 30–140 poise and in a composition which is similar to that of natural magmatic rocks. This slag, with suitable physical treatment, can be allowed to crystallize to cast stone.

In the technological system of the complex energetics-technological process of this invention, the portion of the material which is free of energy sources but contains metal compounds and silicates, is adjusted to a solid state or liquid state phase, depending upon the temperature developed in the firing technical equipment. Then the composition of the material is modified by removing, as intermediate or end products, its iron content or its content of iron alloys such as FeSi, FeSiAl or FeMn. Limestone is then added to the material system so modified. Dicalcium silicate and calcium aluminate are formed. Then the calcium aluminate is extracted. From it, alumina, then from alumina, aluminum metal, is produced electrolytically, using the direct current generated in the complex system. Aluminum metal or aluminum alloys such as SiAl or FeSiAl are obtained from the $Al_2O_3$ content of the melt by the aluminum subhalogenide method combined with carbothermal reduction and with the use of aluminum halogenides. Then the mainly silicate-containing residue of both processes, carried out both in a solid and in a liquid phase, is processed in a manner such that, on further addition of limestone, cement is prepared from the solid material. Melted silicates or expediently, upon addition of mineral additives, cast stones or, on further addition of CaO, a melted cement clinker, are produced from the liquid material.

The above described technological steps are characterized by mixing solid slag or fly-ash or their mixture with limestone and adjusting the molar ratio of the mixture to 1.8 to 2.2 $CaO/SiO_2$ and to $CaO/Al_2O_3$ 1.1 to 1.3, and adding reducing metal alloys, the clinkered product is extracted with a sodium carbonate solution or with water until its $Al_2O_3$ content is decreased to a value between 4 and 10%, then the obtained product, which contains CaO 40–70% and $Fe_2O_3$ 5–10%, is clinkered, on addition of further amounts of limestone, to cement comprised of $SiO_2$ 20–25%, $Al_2O_3$ 4–10%, $Fe_2O_3$ 4–8% and CaO 50–70%. The amount of $Fe_2O_3$ present in the liquid slag is decreased to a level below 10% by removing the liquid iron obtained on carbothermal reduction and, respectively, by conversion of the iron content into FeSi. The $Al_2O_3$ content of the melt obtained in this manner is then decreased to a level below 10% by carbothermal reduction, with the use of the subhaloid method. Calcium carbonate is added to the melt, whose composition is CaO 20–30%, $Fe_2O_3$ 1–10%, $P_2O_5$ 11–13% + $TiO_2$ + MgO + $SO_3$, and the resultant mixture is clinkered to cement of the above given composition.

One may also proceed in the following manner: when it is desired that cast stone be the end product of the melted silicate phase, the alkali content of the melt is raised to a level over 3%. This may be expediently accomplished by adding to the melt $Na_2CO_3$ and/or $CaCO_3$. Alternatively, $CO_2$ gas, developed in the complex system, can be blown into the melt until its gas content is raised to about 30%. A foamed cast stone is thereby produced.

The energetic and material balances of the individual units or of the units coupled to each other of the above described production process of the complex energetics-technological system are controlled in a way that the energy requirement of the operational process of the system of basic materials is preferably fully satisfied by the energy produced by the complex system. If desired, surplus energy is utilized for the production of electric power. Loss of material due to waste formation from the materials introduced into the complex system is reduced to a minimum level or eliminated completely.

Illustrative embodiments of the process of the present invention are presented in the examples which follow.

EXAMPLE 1

In a power station heated by powdered coal, 717 kg of coal, having a calorific value of 3000 kcal, are fired. 1050 KWhr of electricity are thereby generated. The ash content of the coal is 34.5%, and the formed ash contains 34% of $Al_2O_3$.

283 kg of bauxite are mixed with the ash. 4 kg of the ash-bauxite mixture are melted and thus reduced, with the use of about 1% of the generated electric power. The 1 kg of ferrosilicon so produced are added to the mixture of ash-bauxite and 570 kg of limestone. The resultant mixture is then finely ground (12% sieve residue, when sifted through a sieve of 88 micron mesh) and subsequently fed into a rotary furnace, shaft furnace or other suitable furnace where the material is sintered for half an hour at 1300 degrees C. end temperature.

During sintering, phases of 2 $CaO.SiO_2$ and 12 $CaO.7Al_2O_3$ are formed. This is necessary for the self-powdering or extractability of the product. The material leaving the furnace decomposes in 2 hours to a powder of 20–30 micron grain size. The 25 kg residue remaining on the sieve can be used for the production of cast stone.

The powdered product is extracted with a sodium carbonate solution of 50 g/liter concentration. The liquid is filtered, and the filtrate is treated with milk of lime, then decomposed with carbon dioxide. The alumina hydrate so produced is washed and processed by calcination to alumina. The 186 kg alumina so obtained are electrolyzed to 93 kg of aluminum with the use of about 1450 KWhr power generated by the power station.

The residue on extraction is washed until free of alkali, then fired in a rotary furnace of the type used in the cement industry, or in a shaft furnace or other suitable furnace. On grinding the obtained clinker, 570 kg of cement are produced.

EXAMPLE 2

1 t of shale having a calorific value of 2800 kcal and an ash content of 33% are fired in a powdered coal firing boiler complemented by a melting cyclone furnace, or slag-melting boiler or other suitable boiler. 1000 KWhr of electric power are generated. The melted slag is tapped from the boiler at 1680 degrees C., and transferred into an electric arc furnace where the material is reduced in the presence of semicoke, whereby 36 kg of ferrosilicon alloy (Fe 47%, Si 53%) are produced.

The melt (with its decreased content of iron and silicon) is transferred into a thermochemical reactor where in the presence of the excess carbon left as a residue of the previous reduction process, the aluminum chloride vapor reacts with the aluminum content and partly with the silicon content of the melt. The subchlorides of aluminum and silicon, which are produced in the vapor phase, are passed through a condenser, leaving a residue of 45 kg of metallic aluminum and 31 kg of a silicon-aluminum alloy (Si 40%, Al 60%).

The 102 kg of melt so produced are utilized as an additive in the production of cast stone.

EXAMPLE 3

1 t of poor quality brown coal, having a calorific value of 3000 kcal and an ash content of 35%, are employed as the starting material. Main components of the ash are $SiO_2$ 45% and $Al_2O_3$ 35%.

The brown coal is fired in a boiler heated with powdered coal according to the conventional technology of power stations. 1050 KWhr of electric power and 350 kg of slag are obtained.

Through the use of not more than 2% of the slag and about 1% of the electric energy generated in the power station, about 1 kg of FeSiAl is obtained by arc light furnace method. The formed powdered slag is admixed with 1 kg of the previously obtained and ground ferroalloy and with 650 kg of limestone ground to a fineness conventional in the cement industry to produce a homogeneous mixture of a fine grain size suitable for solid phase reactions. The composition of the mixture corresponds to the conditions of formation of calcium aluminates having a stoichiometric ratio between the limits 2 $CaO.SiO_2$ and $12CaO.7Al_2O_3$—$CaO.Al_2O_3$, as is required for spontaneous decomposition to a powder. The heat treatment operation is carried out at a temperature of 1300 degrees C. in a rotary furnace, shaft furnace or other suitable furnace. The favorable spontaneous decomposition of the sintered product to powder is secured by a cooling drum, cooling grate or other suitable cooling device controlled by a suitable cooling program. The powder is classified by sifting, then used as an additive in the production of alumina and in the production of cast stone. From 700 kg of slag that is decomposed spontaneously to powder, 70 kg of alumina are produced with the use of 40 KWhr electric power. Using an additional 650 KWhr of electrical energy, this amount of alumina can be processed by conventional metallurgic methods to 35 kg of aluminum metal.

630 kg of dry residue obtained on extraction are mixed with 120 kg of limestone ground to a fineness conventional in the cement industry. From this mixture about 700 kg of cement of portland cement quality are produced by heat treatment, requiring 80 KWhr of electric energy.

In this manner by firing 1 t of poor quality brown coal and 650 kg of limestone, a total of 440 KWhr of electric power, 35 kg of metallic aluminum, 700 kg of cement and cast stone additive are produced. 70 kg of alumina are obtained as an intermediate product.

EXAMPLE 4

7.17 t of coal having a calorific value of 3000 kcal and an ash content of 34.5% are fired in a power station heated by powdered coal. 10500 KWhr of electric power are generated. The formed ash contains 34% $Al_2O_3$. 2.83 t of bauxite are mixed with the ash. The resultant mixture is finely ground (12% sieve residue on sifting through a 88 micron mesh sieve) together with 5.7 t of limestone, then heat-treated in a rotary furnace at 1300 degrees C. until the phases 2 $CaO.SiO_2$ and 12 $CaO.7Al_2O_3$ are formed.

EXAMPLE 5

10 t of shale having a calorific value of 2800 kcal and an ash content of 33% are fired in a boiler heated with powdered coal and complemented by a melting cyclone. 10000 Kwhr of electric power are thus generated. The slag melt, which leaves the boiler at a temperature of 1600 degrees C., is transferred into an electric arc light furnace, where it is reduced in the presence of semicoke. 360 kg of ferrosilicon alloy (Fe 47%, Si 53%) are produced. The melt (with decreased content of iron and silicon) is introduced into a thermochemical reactor. Aluminum chloride is then employed in a manner known per se and subhalogenides are removed by distillation. 450 kg of aluminum metal and 310 kg of silico-aluminum (Si 40%, Al 60%) are thereby obtained. The residual melt is adjusted to the molar ratios $CaO/SiO_2=4.5$ and $CaO+MgO+Na_2O+K_2O/Al_2O_3=2.9$.

EXAMPLE 6

10 t of brown coal having a calorific value of 3000 kcal and an ash content of 35% (main components of the ash are 45% $SiO_2$ and 35% $Al_2O_3$) are fired in a power station boiler suitable for heating with powdered coal. 10500 KWhr of electric power and 3500 kg of slag are obtained. The solid phase slag is ground with 6.5 t of limestone to a homogeneous mixture of fine grain size, and heat-treated in a rotary furnace until its main mass is converted to the phase components 2 $CaO.SiO_2$ and 12 $CaO.7 Al_2O_3$. The aluminum content of the product is decreased in a known way by extracting it and converting it to alumina hydrate. The residue is adjusted to the molar ratios $CaO/SiO_2=6.0$ and $CaO/Al_2O_3=8.5$ by addition of further amounts of limestone.

EXAMPLE 7

10 t of coal having a calorific value of 2850 kcal and an ash content of 36% are fired in the presence of 6.8 t of carbonate-bearing manganese ore, in a fluidized bed boiler. The resultant slag is mixed with 600 kg of red mud. The mixture is reduced in an electric arc light furnace and in the presence of coke. 1600 kg of a ferromanganese alloy are obtained. Limestone is then added to the liquid residue until the molar ratios $CaO/SiO_2=2.4$ and $CaO+MgO+Na_2O+K_2O/Al_2O_3=1.3$ are attained. The metal oxides and metal oxysilicates so produced can serve as basic materials for the production of diversified end products. Their main use is in the building industry.

EXAMPLE 8

140 kg of black coal are subjected to distillation. 70 kg semicoke and 42 $m^3$ gas having a calorific value of 4500 $kcal/m^3$ are produced. This amount of gas together with 1.2 t coal having a calorific value of 350 kcal are complemented with 480 kg of carbonate-bearing manganese ore and fired in a power station. The half-product which is rich in manganese and is obtained as boiler slag in mixed with 60 kg of red mud and with the semicoke previously obtained. The resultant mixture is reduced in an electric arc light furnace. The electric power for the arc light furnace is supplied by the power generated at the power station. The reduction process yields 160 kg of FeMn carburite. After crystallization, the residual slag can be used for the production of very high-strength cast stone.

In summary, the starting material of the instant process is selected from the group consisting of materials having low combustibles content (eg. coals contaminated with overburden, oil shale etc.), materials whose combustibles content has been reduced by subjecting same to gasification and a mixture of coal having reduced combustibility with one or more mineral additives, all of the foregoing having a heat of combustion of about 2,000 to 3,500 kcal/kg. In the first step of the process, the starting material is subjected to combustion (firing), whereby heat energy and molten slag are produced. When addition of aluminum, silicon, iron, or manganese is required, the respective calcium containing material is employed (eg. low grade bauxite, siderite, red mud, carbonate containing manganese ore or limestone). The produced slag contains 15 to 50% alumina, 15 to 20% silica and 13 to 45% other oxides (principally iron oxide, manganese oxide and calcium oxide). In the second step of the process, the thus produced slag, or a slag adjusted by addition of necessary additives so that it contains 15 to 50% alumina, 15 to 20% silica and 13 to 45% of said other oxides, is treated (by, for example, carbothermal reduction) so as to reduce its iron, silicon, aluminum and manganese content. In the next step of the process, one or more of the above additives is added so as to produce:

(a) upon subsequent sintering, a product having at least 20% $2CaO.SiO_2$ and 20% $CaO.7Al_2O_3$ mineral phase components, and containing $CaO.SiO_2$ and $Al_2O_3$; the CaO and $SiO_2$ being present in a respective molar ratio of 2.2 to 6.0:1 and the CaO and $Al_2O_3$ being present in a respective molar ratio of 4.5 to 8.5:1. Then, less than 1% Fe-Si or Fe-Si-Al alloy is added to promote self disintegration. The mixture is then sintered;

or (b) a product containing CaO and $SiO_2$ in in a respective molar ratio of 2.2 to 6.0:1; CaO and $Al_2O_3$ in a respective molar ratio of 1.1 to 1.3:1; and (CaO+MgO+$Na_2O$+$K_2O$) and $Al_2O_3$ in a respective molar ratio of 1.3 to 2.9:1.

The product, so produced, is then melted through use of the heat energy produced, in situ, during the combustion step. Preferably such product is melted solely through use of the heat energy generated in said combustion step.

What is claimed is:

1. A process for producing energy and products useful in the manufacture of metals, cement and artificial stone which comprises the steps of:
   (a). combusting a carbonaceous waste material containing silica and alumina; and having a heat of combustion of from about 2,000 kcal/kg to about 3,500 kcal/kg to form thermal energy and a slag containing silica and alumina;
   (b). adjusting the composition of said slag by adding a mineral additive including a calcium containing material to said slag to obtain upon sintering calcium silicate and calcium aluminate;
   (c). additionally adding an amount of under 1% of ferrosilicon alloy to the adjusted slag to promote disintegration upon sintering and cooling;
   (d). sintering and cooling the adjusted slag of step (c) to obtain a disintegrated material;
   (e). separating said disintegrated material and recovering a separated material and a first residue remaining useful for forming artificial stone;
   (f). treating said separated material with an aqueous solution to extract aluminum values and leaving a second residue useful for forming cement;
   (g). treating said aluminum values to obtain alumina;
   (h). treating said alumina to obtain aluminum.

2. The process of claim 1, wherein said starting material is low value coal, oil shale, lignite or peat.

3. The process of claim 1, wherein the mineral additive is at least one of bauxite, siderite, red mud, and limestone.

4. The process of claim 1, wherein calcium carbonate is added to said second residue before processing it into cement.

* * * * *